(12) United States Patent
Huang et al.

(10) Patent No.: US 12,242,919 B2
(45) Date of Patent: Mar. 4, 2025

(54) SAMPLE ANALYSIS SYSTEM AND SAMPLE MANAGEMENT METHOD

(71) Applicant: SHENZHEN MINDRAY BIO-MEDICAL ELECTRONICS CO., LTD., Shenzhen (CN)

(72) Inventors: Xinyuan Huang, Shenzhen (CN); Fanshun Zeng, Shenzhen (CN)

(73) Assignee: SHENZHEN MINDRAY BIO-MEDICAL ELECTRONICS CO., LTD., Shenzhen (CN)

(*) Notice: Subject to any disclaimer, the term of this patent is extended or adjusted under 35 U.S.C. 154(b) by 0 days.

(21) Appl. No.: 18/393,628

(22) Filed: Dec. 21, 2023

(65) Prior Publication Data

US 2024/0127015 A1    Apr. 18, 2024

Related U.S. Application Data

(63) Continuation of application No. 17/709,145, filed on Mar. 30, 2022, now Pat. No. 11,915,094, which is a continuation of application No. PCT/CN2019/120780, filed on Nov. 26, 2019.

(30) Foreign Application Priority Data

Sep. 30, 2019    (WO) ............... PCT/CN2019/109531

(51) Int. Cl.
*G06K 7/14*    (2006.01)
(52) U.S. Cl.
CPC .................. *G06K 7/1413* (2013.01)

(58) Field of Classification Search
CPC ...... G06K 7/1413; G06K 7/14; G06K 7/1417; G06K 7/00; G06K 7/1404
USPC .................... 235/462.01, 454, 375
See application file for complete search history.

(56) References Cited

U.S. PATENT DOCUMENTS

| | | | |
|---|---|---|---|
| 2015/0241684 A1 | 8/2015 | Morrison et al. | |
| 2015/0316451 A1 | 11/2015 | Sercel et al. | |
| 2016/0018427 A1* | 1/2016 | Streibl | G01F 23/2921 |
| | | | 702/19 |
| 2018/0143214 A1 | 5/2018 | Bueren | |
| 2018/0164335 A1* | 6/2018 | Pollack | G01N 35/00603 |

(Continued)

FOREIGN PATENT DOCUMENTS

| | | |
|---|---|---|
| CN | 104395759 A | 3/2015 |
| CN | 104569461 A | 4/2015 |
| CN | 105277726 A | 1/2016 |

(Continued)

*Primary Examiner* — Edwyn Labaze
(74) *Attorney, Agent, or Firm* — BAYES PLLC

(57) ABSTRACT

A sample analysis system and a sample management method are provided. The sample analysis system includes: one or more analysis devices configured to test a sample; a scanning component configured to scan the sample to obtain scanning information before testing the sample by the analysis devices; an image information obtaining component configured to acquire image information of a region in the sample containing a sample identifier; a processor configured to identify the sample identifier of the sample according to at least one of the scanning information or the image information of the sample. The system can obtain the sample identifier of a sample in two ways, thus improving the efficiency of sample test.

14 Claims, 6 Drawing Sheets

(56) References Cited

U.S. PATENT DOCUMENTS

2020/0387912 A1   12/2020   Allen et al.

FOREIGN PATENT DOCUMENTS

| CN | 105518462 | A |   | 4/2016  |           |
|----|-----------|---|---|---------|-----------|
| CN | 107076732 | A |   | 8/2017  |           |
| CN | 108089019 | A |   | 5/2018  |           |
| CN | 116930531 | A | * | 10/2023 |           |
| JP | 2000131327| A | * | 5/2000  |           |
| JP | 2011075445| A | * | 4/2011  | G01N 35/026 |
| JP | 2013011481| A |   | 1/2013  |           |

* cited by examiner

# SAMPLE ANALYSIS SYSTEM AND SAMPLE MANAGEMENT METHOD

CROSS-REFERENCE

This application is a continuation of U.S. application Ser. No. 17/709,145 filed Mar. 30, 2022, which is a continuation of International Application No. PCT/CN2019/120780, filed Nov. 26, 2019, which claims the benefit of priority to International Application No. PCT/CN2019/109531, filed Sep. 30, 2019, the content of which are incorporated herein by reference.

TECHNICAL FIELD

The disclosure relates to a sample analysis system and a sample management method therefor.

BACKGROUND

Analysis devices for samples are instruments for testing samples, and may include a cell analyzer, a blood coagulation analyzer, a urine analyzer, a biochemical analyzer, an immunoassay analyzer, a slide maker, a cell morphology analyzer, and the like.

As a large number of samples need to be measured, a sample analysis system for testing samples in an assembly line appears, to meet high flux and shorten test time. Such a sample analysis system includes a plurality of cascaded analysis devices, which are connected to each other by a track. The sample analysis system is mainly characterized by placing all samples to be tested into an input module, by which test items for the samples that are to be performed are determined, and then sequentially dispatching the samples over the track into the corresponding analysis devices for testing. After one analysis device completes testing, if the samples still need to be tested in other analysis devices, the system automatically dispatches the samples into the other corresponding analysis devices for testing until all the test items for the samples are completed.

To make sample testing more convenient and more automated, currently, a barcode mode technology is widely employed for both a standalone analysis device for sample testing and a system with a plurality of cascaded analysis devices for sample testing in an assembly line. To be specific, a sample identifier of a sample is obtained by scanning the sample, so that test items for the sample are automatically determined, and test results of the sample is subsequently associated with the sample. However, in actual circumstances, scanning often fails due to various situations such as poor quality and scratches of a barcode of the sample, and the system cannot obtain the sample identifier of the sample, which interferes with or even interrupts sample testing.

SUMMARY

To resolve the foregoing problems, the disclosure mainly provides a sample analysis system and a sample management method therefor.

According to a first aspect, an embodiment provides a sample analysis system, including:
- at leased one analysis device configured to test a sample;
- a scanning component configured to scan the sample before the sample is tested by the analysis device, to obtain scanning information of the sample;
- an image information obtaining component configured to obtain image information of a region in the sample, wherein the region contains a sample identifier; and
- a processor configured to identify the sample identifier of the sample based on at least one of the scanning information and the image information of the sample.

According to a second aspect, an embodiment provides a sample analysis system, including:
- an input module configured to receive a sample; wherein the input module includes a scanning component configured to scan the sample to obtain scanning information of the sample;
- at least one analysis device configured to test the sample; wherein any one of the at least one analysis device includes a scanning component configured to scan the sample before the sample is tested by the analysis device, to obtain scanning information of the sample;
- a track configured to connect the input module and the at least one analysis device;
- a dispatching apparatus configured to dispatch the sample over the track;
- a processor configured to determine a sample identifier of each sample based on scanning information of the sample; and
- an image information obtaining component configured to obtain image information of a region in the sample containing a sample identifier; wherein for any sample, when the processor fails to determine a sample identifier of the sample based on the scanning information of the sample, the image information of the region in the sample containing the sample identifier that is obtained by the image information obtaining component is used to determine the sample identifier of the sample.

According to a third aspect, an embodiment provides a sample analysis system, including:
- a measurement component configured to measure a sample to obtain an item test result of the sample;
- a sample component configured to hold a sample to be tested, aspirate the sample to be tested and then provide the aspirated sample to the measurement component;
- a reagent component configured to hold a reagent, aspirate the reagent and then provide the aspirated reagent to the measurement component;
- a scanning component configured to scan the sample to obtain scanning information before testing the sample;
- a processor configured to determine a sample identifier of each sample based on scanning information of the sample; and
- an image information obtaining component configured to obtain image information of a region in the sample containing a sample identifier; wherein for any sample, when the processor fails to determine a sample identifier of the sample based on the scanning information of the sample, the image information of the region in the sample containing the sample identifier that is obtained by the image information obtaining component is used to determine the sample identifier of the sample.

In an embodiment, when the processor fails to determine the sample identifier of the sample based on the scanning information of the sample, the processor determines the sample identifier of the sample based on the image information of the sample that is obtained by the image information obtaining component.

In an embodiment, when the processor fails to determine the sample identifier of the sample based on the scanning information of the sample, the processor determines the sample identifier of the sample based on the image information of the sample that is obtained by the image information obtaining component, and determines a test item for the sample based on the sample identifier of the sample.

In an embodiment, when the processor fails to determine the sample identifier of the sample based on the scanning information of the sample, the processor allocates a unique invalid identifier to the sample, and enables a specific test mode for the sample.

In an embodiment, the processor enabling a specific test mode for the sample includes: the processor enabling a test mode for the sample, wherein the test mode includes maximum supported items of the analysis device, or the processor enabling a test mode for the sample, wherein the test mode includes normal items of the analysis device.

In an embodiment, the sample analysis system further includes a display, wherein the display is configured to display a sample identifier modification interface, wherein the sample identifier modification interface includes an invalid identifier of an invalid sample, a sample identifier image of the invalid sample, and an interface component for inputting a sample identifier; wherein the invalid sample is a sample with an invalid identifier, and the sample identifier image is generated by the processor based on the image information of the region containing the sample identifier;

the processor receives an inputted sample identifier via the interface component; and the processor modifies the invalid identifier of the invalid sample to the inputted sample identifier.

In an embodiment, the processor determines the sample identifier of the invalid sample based on the image information of the invalid sample, and inputs the sample identifier into the interface component so as to be displayed by the display, wherein the sample identifier inputted by the processor at the interface component is modifiable by a user; and in response to a confirmation command, the processor receives the inputted sample identifier via the interface component, and modifies the invalid identifier of the invalid sample to the currently inputted sample identifier.

In an embodiment, the processor further obtains a position index and a sample identifier of each sample, and establishes a mapping relationship between the position index and the sample identifier of each sample; and when the processor fails to determine the sample identifier of the sample based on the scanning information of the sample, the processor further determines the sample identifier of the sample based on the position index of the sample and according to the mapping relationship.

In an embodiment, when the processor fails to determine the sample identifier of the sample based on the scanning information of the sample, the image information obtaining component obtains the image information of the region in the sample containing the sample identifier.

According to a fourth aspect, an embodiment provides a sample management method, including:

scanning a sample to obtain scanning information of the sample;

obtaining image information of a region in a sample containing a sample identifier; and identifying the sample identifier of the sample based on at least one of the scanning information and the image information of the sample.

According to a fifth aspect, an embodiment provides a sample management method, including:

scanning a sample to obtain scanning information of the sample, where the scanning information is used to determine a sample identifier of the sample; and when the sample identifier of the sample fails to be determined based on the scanning information of the sample, obtaining image information of a region in the sample containing the sample identifier, to determine the sample identifier of the sample.

In an embodiment, when the sample identifier of the sample fails to be determined based on the scanning information of the sample, the sample identifier of the sample is determined based on the obtained image information of the sample.

In an embodiment, when the sample identifier of the sample fails to be determined based on the scanning information of the sample, the sample identifier of the sample is determined based on the obtained image information of the sample, and a test item for the sample is determined based on the sample identifier of the sample.

In an embodiment, when the sample identifier of the sample fails to be determined based on the scanning information of the sample, the processor allocates a unique invalid identifier to the sample, and enables a specific test mode for the sample.

In an embodiment, enabling a specific test mode for the sample includes: enabling a test mode for the sample including maximum supported items of an analysis device, or enabling a test mode for the sample including normal items of the analysis device.

In an embodiment, the sample management method further includes:

displaying a sample identifier modification interface, wherein the sample identifier modification interface includes an invalid identifier of an invalid sample, a sample identifier image of the invalid sample, and an interface component for inputting a sample identifier; wherein the invalid sample is a sample with an invalid identifier, and the sample identifier image is generated based on the image information of the region containing the sample identifier;

receiving an inputted sample identifier via the interface component; and modifying the invalid identifier of the invalid sample to the inputted sample identifier.

In an embodiment, the sample management method further includes:

further determining the sample identifier of the invalid sample based on the image information of the invalid sample, and inputting the sample identifier into the interface component so as to be displayed, wherein the sample identifier inputted at the interface component is modifiable by a user; and in response to a confirmation command, receiving the inputted sample identifier via the interface component, and modifying the invalid identifier of the invalid sample to the currently inputted sample identifier.

In an embodiment, the sample management method further includes:

obtaining a position index and a sample identifier of each sample, and establishing, a mapping relationship between the position index and the sample identifier of each sample; and when the sample identifier of the sample fails to be determined based on the scanning information of the sample, further determining the sample identifier of the sample based on the position index of the sample and according to the mapping relationship.

In an embodiment, when the sample identifier of the sample fails to be determined based on the scanning information of the sample, the image information of the region in the sample containing the sample identifier is obtained.

According to a sixth aspect, an embodiment provides a computer-readable storage medium, including a program, where the program is executable by a processor to implement the method described in any one of the embodiments herein.

DETAILED DESCRIPTION

Figure 1:
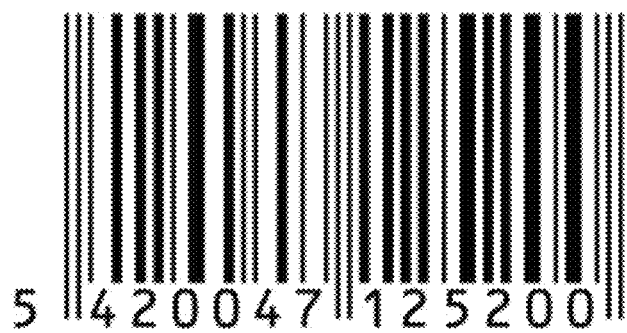
FIG. 1 is a schematic diagram of an information code of a sample according to an embodiment.

The disclosure will be further described in detail below through specific implementations in conjunction with the accompanying drawings. Associated similar element reference numerals are used for similar elements in different implementations. In the following implementations, many details are described such that the disclosure may be better understood. However, it may be effortlessly appreciated by persons skilled in the art that some of the features may be omitted, or may be substituted by other elements, materials, and methods in different cases. In certain cases, some operations involved in the disclosure are not displayed or described in the specification, which is to prevent a core part of the disclosure from being obscured by too much description. Moreover, for persons skilled in the art, the detailed description of the involved operations is not necessary, and the involved operations can be thoroughly understood according to the description in the specification and general technical knowledge in the art.

In addition, the characteristics, operations, or features described in the specification may be combined in any appropriate manner to form various implementations. Meanwhile, the steps or actions in the method description may also be exchanged or adjusted in order in a way that is obvious to persons skilled in the art. Therefore, the various orders in the specification and the accompanying drawings are merely for the purpose of clear description of a certain embodiment and are not meant to be a necessary order unless it is otherwise stated that a certain order must be followed.

The serial numbers themselves for the components herein, for example, "first" and "second", are merely used to distinguish the described objects, and do not have any sequential or technical meaning. Moreover, as used in the disclosure, "connection" or "coupling", unless otherwise stated, includes both direct and indirect connections (couplings).

A sample analysis system herein may be a system related to a standalone analysis device for testing, or may be a system with a plurality of cascaded analysis devices for sample testing in an assembly line. To make persons skilled in the art better understand the disclosure, barcode technology is described first.

After collecting a sample, which may be a physical testing object such as blood and tissue, a user such as medical care personnel places the sample in a sample holding container. Depending on actual needs, the sample holding container may be a test tube, a slide, or the like. The sample holding container is provided with an information code representing a sample identifier. Typically, the information code may be an identification code representing a unique sample identifier, for example, a barcode or a two-dimensional code. The system uses a barcode scanner to scan the information code on the sample holding container, to obtain scanning information. The system then decodes the scanning information to obtain the sample identifier.

The barcode scanner, also referred to as a barcode reader or a barcode scanning gun, is a device for reading an information code such as a barcode or a two-dimensional code. A working principle of a type of barcode scanner is as follows: the barcode scanner emits a light beam to the information code to be read, the light beam is reflected upon striking on the information code, and light reflected by the information code is then received by the barcode scanner and is converted into electric signals after photoelectric conversion, so that scanning information is obtained; and content included in the information code to be read may be obtained by decoding the scanning information.

A standalone sample analysis system for testing is taken as an example. After receiving a sample placed by a user, an analysis device in the system scans the sample to obtain scanning information, and then determines a sample identifier of the sample based on the scanning information. The system may determine a sample number, test items to be performed for the sample, and the like based on the sample identifier (for example, the system may query for various information about the sample through a LIS system based on the sample identifier), then control to perform the test items to be performed for the sample, and associate test results with the sample number.

A sample analysis system with a plurality of cascaded analysis devices in an assembly line is taken as another example. Generally, an input module and the analysis devices all scan a sample. The sample is scanned at the input module mainly because the system needs to know test items to be performed for the sample and then dispatches the sample to one or more corresponding analysis devices for corresponding item tests. For example, a sample S1 and a sample S2 are scanned at the input module; the system determines that the sample S1 needs to be subjected to items Test 11 to Test 14 in a first analysis device and items Test 21 to Test 25 in a second analysis device; the system determines that the sample S2 needs to be subjected to items Test 21 to Test 23 only in the second analysis device; the system thus controls to dispatch the sample S1 to the first analysis device and the second analysis device for testing, and to dispatch the sample S2 only to the second analysis device for testing; the sample is scanned again at each analysis device mainly because the analysis device needs to know item tests to be performed for the current sample, so as to test the sample based on the item tests to be performed for the sample, and associate test results with the corresponding sample. For example, after the sample S1 is dispatched to the first analysis device, the first analysis device scans the sample S1 and determines that the items Test 11 to Test 14 need to be performed on the sample S1, and therefore the first analysis device performs the items Test 11 to Test 14 on the sample S1, and associates test results with the sample S1. After the sample S1 and the sample S2 are dispatched to the second analysis device, the second analysis device scans the sample S1 and the sample S2 respectively and determines that the items Test 21 to Test 25 need to be performed on the sample S1 and the items Test 21 to Test 23 need to be performed on the sample S2. Therefore, the second analysis device performs the items Test 21 to Test 25 on the sample S1 and associates test results with the sample S1, and performs the items Test 21 to Test 23 on the sample S2 and associate test results with the sample S2.

It can be seen that when the sample analysis system fails to obtain the sample identifier based on the scanning information due to factors such as poor quality and scratches of the information code of the sample, sample testing is interfered with or even interrupted. In this case, the applicant considers scanning the sample to obtain the scanning information and further obtaining image information of a region containing the sample identifier, and identifying the sample identifier of the sample based on at least one of the scanning information and the image information of the sample. For example, for any sample, when the system can determine the sample identifier of the sample based on either of the scanning information and the image information, the system may determine the sample identifier based on either of them, and may preferably determine the sample identifier based on the scanning information. Alternatively, the system determines the sample identifier based on the scanning information and the image information respectively and then compares the sample identifier determined based on the scanning information with the sample identifier determined based on the image information. If the sample identifier determined based on the scanning information and the sample identifier determined based on the image information are the same, it indicates that the sample identifier is correct, and if the sample identifier determined based on the scanning information and the sample identifier determined based on the image information are different, a prompt is issued. Optionally, in this case, the sample identifier determined based on one of the scanning information and the image information may be temporarily used as a temporary sample identifier of the sample for item testing and association of test results. In some cases, for example, when the captured image information is so blurred that the system can determine the sample identifier based on only the scanning information thereof rather than the image information thereof, the system determines the sample identifier based on the scanning information. In some cases, for example, when the information code of the sample is partly stained, and the system can determine the sample identifier based on only the image information thereof rather than the scanning information thereof, the system determines the sample identifier based on the image information, or the system generates an image based on the image information for a user to check, so that the user can fill in the system with numbers in the image to allow the system to determine the sample identifier.

Persons skilled in the art may understand that the scanning information and the image information herein are different concepts, one is information obtained by scanning a sample, and the other is information obtained by, for example, photographing the sample. For example, an information code of a sample is a barcode. Referring to FIG. 1, information about a black-and-white barcode in the figure that is obtained by scanning a barcode (that is, the black-and-white barcode in the figure) on a sample holding container is referred to as scanning information. A sample identifier, for example, numbers below the barcode representing real information of the black-and-white barcode, may be obtained by decoding the scanning information. Image information of a region containing a sample identifier may be obtained by photographing the region containing the barcode. The sample identifier is obtained by performing image recognition on the image information, for example, by performing optical character recognition (OCR) on numbers below the barcode in the image. Alternatively, a corresponding image is generated based on the image information of the region containing the sample identifier and displayed for a user to check, so that the user can fill in the system with the numbers in the image to allow the system to determine the sample identifier. It should be noted that the barcode in FIG. 1 is merely for illustration, and the information code of the sample is not limited thereto.

The following describes the sample analysis system of the disclosure in detail.

Figure 2:
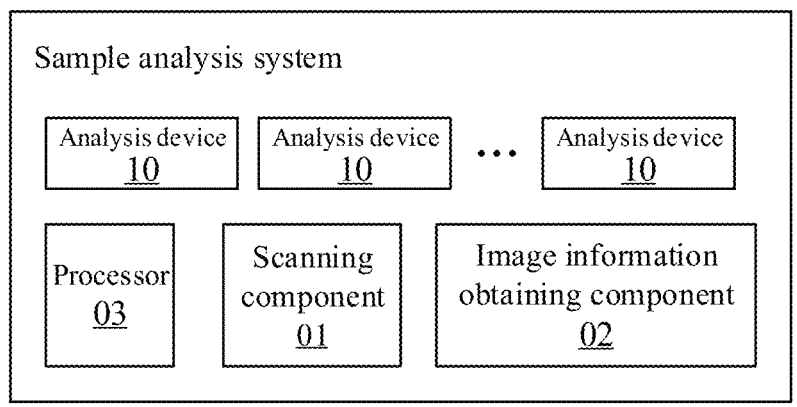
FIG. 2 is a schematic structural diagram of a sample analysis system according to an embodiment.

Referring to FIG. 2, the sample analysis system includes at least one analysis device 10, a scanning component 01, an image information obtaining component 02, and a processor 03. The at least one analysis device 10 is configured to test a sample. The scanning component 01 is configured to scan the sample before the sample is tested by the at least one analysis device 10, to obtain scanning information of the sample. The image information obtaining component 02 is configured to obtain image information of a region in the sample containing a sample identifier. The scanning component 01 may be an existing barcode scanner or the like. The image information obtaining component 02 may be a camera or the like. The processor 03 is configured to identify the sample identifier of the sample based on at least one of the scanning information and the image information of the sample. For example, for any sample, when the processor 03 can determine the sample identifier of the sample based on either of the scanning information and the image information, the processor 03 may determine the sample identifier based on either of them, and may preferably determine the sample identifier based on the scanning information. Alternatively, the processor 03 determines the sample identifier based on the scanning information and the image information respectively and then compares the sample identifier determined based on the scanning information with the sample identifier determined based on the image information. If the sample identifier determined based on the scanning information and the sample identifier determined based on the image information are the same, it indicates that the sample identifier is correct, and if the sample identifier determined based on the scanning information and the sample identifier determined based on the image information, a prompt is issued. Optionally, in this case, the sample identifier determined based on one of the scanning information or the image information may be temporarily used as a temporary sample identifier of the sample for item testing and association of test results. In some cases, for example, when the captured image information is so blurred that the processor 03 can determine the sample identifier based on only the scanning information thereof rather than the image information thereof, the processor 03 determines the sample identifier based on the scanning information. In some cases, for example, when the information code of the sample is partly stained, and the processor 03 can determine the sample identifier based on only the image information of the sample rather than the scanning information, the processor 03 determines the sample identifier based on the image information.

As described above, the sample analysis system may include one or more analysis devices 10. When the sample analysis system includes only one analysis device 10, the sample analysis system is actually a standalone system for testing. When the sample analysis system includes a plurality of cascaded analysis devices 10, the sample analysis system is actually a sample analysis system in an assembly line.

Figure 3:
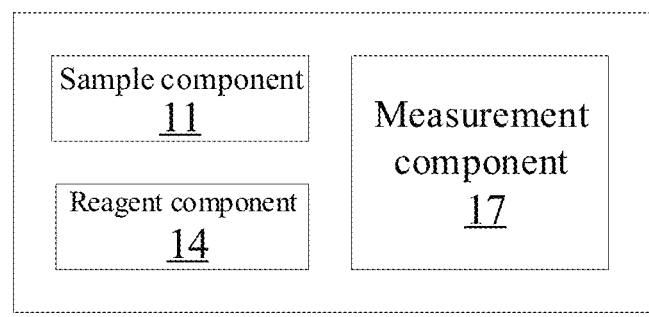
FIG. 3 is a schematic structural diagram of an analysis device according to an embodiment.

Referring to FIG. 3, in some embodiments, the analysis device 10 may include a sample component 11, a reagent component 14, and a measurement component 17. Details are described in the following.

Figure 4:
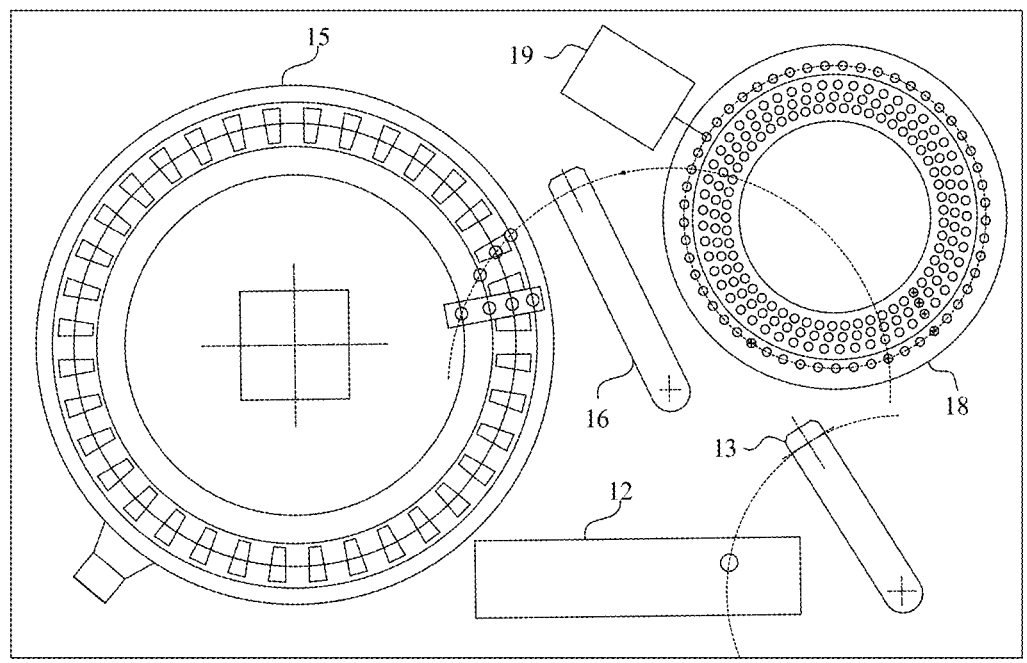
FIG. 4 is a schematic structural diagram of an analysis device according to another embodiment.

The sample component 11 is configured to hold a sample to be tested, aspirate the sample and then provide the aspirated sample to the measurement component 17. Referring to FIG. 4, in some embodiments, the sample component 11 may include a sample feeding component 12 and a sample dispensing mechanism 13. The sample feeding component 12 is configured to hold the sample. In some examples, the sample feeding component 12 may include a sample delivery module (SDM) and a front-end track. In some other examples, the sample feeding component 12 may alternatively be a sample disk, which includes a plurality of sample positions in which, for example, sample tubes can be placed. The sample disk can dispatch, by rotating its disk structure, the sample to a corresponding position, for example, a position that allows the sample dispensing mechanism 13 to aspirate the sample. The sample dispensing mechanism 13 is configured to aspirate and discharge the sample into a reaction cup to be subjected to sample addition. For example, the sample dispensing mechanism 13 may include a sample needle, which performs a two-dimensional or three-dimensional movement in space by using a two-dimensional or three-dimensional driving mechanism, so that the sample needle can move to aspirate the sample held by the sample feeding component 12, move to the reaction cup to be subjected to sample addition, and discharge the sample into the reaction cup.

In an embodiment, the sample in the sample feeding component 12 is dispatched to the scanning bit, the scanning component 01 is configured to scan the sample in the scanning bit to obtain scanning information of the sample, at the same time, the image information obtaining component 02 obtains image information of a region in the sample containing a sample identifier. After then, the sample is dispatched to the sample dispensing mechanism 13.

The reagent component 14 is configured to hold a reagent, aspirate the reagent and then provide the aspirated reagent to the measurement component 17. In some embodiments, the reagent component 14 may include a reagent holding component 15 and a reagent dispensing mechanism 16. The reagent holding component 15 is configured to hold the reagent. In an embodiment, the reagent holding component 15 may be a reagent disk, which has a circular disk structure and is provided with a plurality of positions for holding reagent containers. The reagent holding component can rotate and drive a reagent container held therein to rotate to a specific position, for example, a position that allows the reagent dispensing mechanism 16 to aspirate the reagent. There may be one or more reagent holding components 15. The reagent dispensing mechanism 16 is configured to aspirate and discharge the reagent into a reaction cup to be subjected to reagent addition. In an embodiment, the reagent dispensing mechanism 16 may include a reagent needle, which performs a two-dimensional or three-dimensional movement in space by using a two-dimensional or three-dimensional driving mechanism, so that the reagent needle can move to aspirate the reagent held by the reagent holding component 15, move to the reaction cup to be subjected to reagent addition, and discharge the reagent into the reaction cup.

The measurement component 17 is configured to test the sample to obtain test data. In some embodiments, the measurement component 17 may include a reaction component 18 and a photometric component 19. The reaction component 18 is provided with at least one placement position, which is configured to place a reaction cup and incubate a reaction solution in the reaction cup. For example, the reaction component 18 may be a reaction disk, which has a circular disk structure and is provided with one or more placement positions for placing reaction cups. The reaction disk can rotate and drive a reaction cup in a placement position thereof to rotate, so as to dispatch the reaction cup in the reaction disk and incubate a reaction solution in the reaction cup. The photometric component 19 is configured to perform photometry on the incubated reaction solution, to obtain reaction data of the sample. For example, the photometric component 19 measures luminous intensity of the reaction solution to be tested and calculates a concentration of a component to be tested in the sample by using a calibration curve, etc. In an embodiment, the photometric component 19 is separately disposed outside the reaction component 18.

Figure 5:
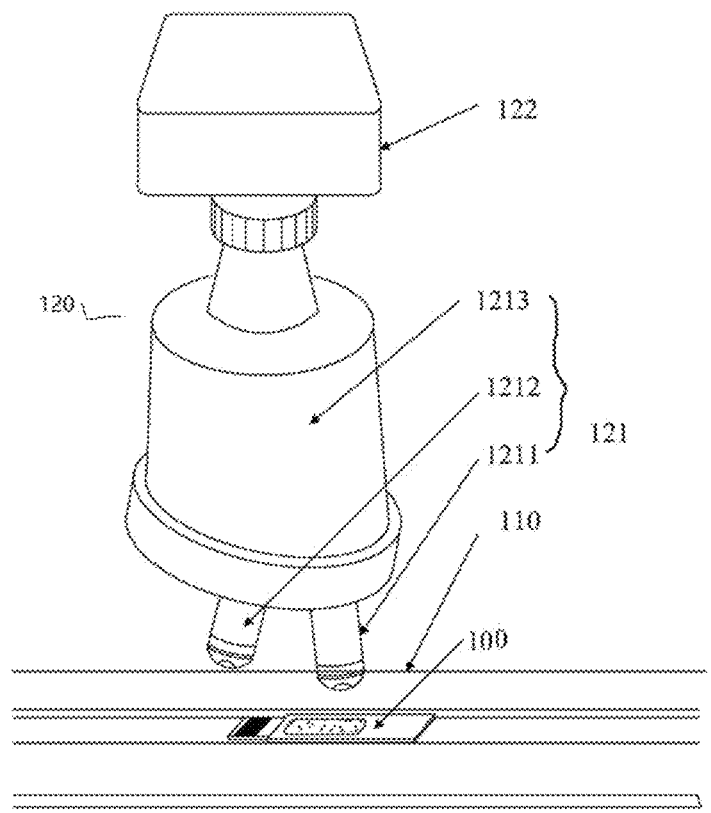
FIG. 5 is a schematic structural diagram of an analysis device according to another embodiment.
Figure 6:
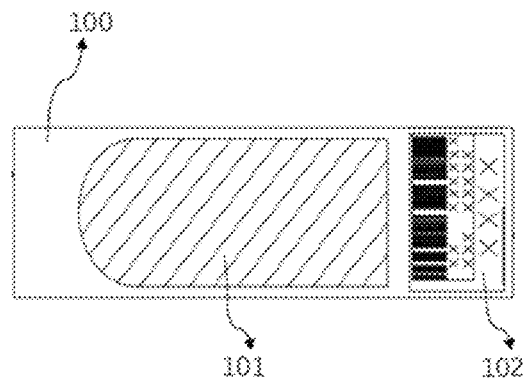
FIG. 6 is a schematic structural diagram of a sample slide.

Referring to FIG. 5 and FIG. 6, in some embodiments, the analysis device 10 may include a sample holding apparatus 110 and an imaging apparatus 120.

The sample holding apparatus 110 is configured to hold or support a sample slide to be tested on which a sample film 101 to be tested is applied. The sample holding apparatus 110 may be, for example, configured to be arranged opposite the imaging apparatus 120 and to be movable relative to the imaging apparatus 120 such that the imaging apparatus 120 can capture an image of a sample component in a specific region of the sample film 101 on the sample slide 100 supported on the sample holding apparatus 110.

The sample holding apparatus 110 is, for example, configured as a test table movable in a horizontal plane, and the test table may have a groove for receiving the sample slide 100. In some other embodiments, the sample holding apparatus 110 may alternatively be configured as a robotic arm movable at least horizontally, and the robotic arm has a gripper for gripping the sample slide 100.

The imaging apparatus 120 is configured to capture a sample on the sample slide to be tested that is held by the sample holding apparatus 110, to obtain a sample component image. For example, when the sample is a blood sample, the sample slide is a blood smear on which a blood film is applied, and sample components are particles such as cells in the blood sample. In this case, the imaging apparatus 120 is configured to capture an image of the cells in the blood film on the blood smear. Certainly, the sample in the disclosure may also be bone marrow, body fluids, etc.

The imaging apparatus 120 may also be referred to as a microscopic optical module. The microscopic optical module includes a lens group 121 and a first camera 122, and the lens group 121 may include a first objective lens 1211 and a second objective lens 1212. The first objective lens 1211 may be, for example, a 10× objective lens or a 40× objective lens, and the second objective lens 1212 may be, for example, a 40× objective lens or a 100× objective lens. The lens group 121 may further include a switching mechanism 1213. The switching mechanism is configured to switch between the first objective lens 1211 and the second objective lens 1212, so that the first camera 122 captures sample component images with different magnifications.

Certainly, in other embodiments, the imaging apparatus 120 may include only the first camera, that is, the arrangement of the lens group may be omitted.

As shown in FIGS. 6, the sample film 11 such as a blood film is applied on the sample slide 100, the sample film side of the sample slide 100 may be further provided with a sample identification portion 102. The scanning component 01 obtains scanning information by scanning the sample identification portion 102, and the image information obtaining component 02 obtains image information of the sample identification portion 102, After then, the sample slide 100 is dispatched to the sample holding apparatus 110, the imaging apparatus 120 obtains image information of the sample film 101 to capture an image of the cells in the sample film 1010.

Figure 7:
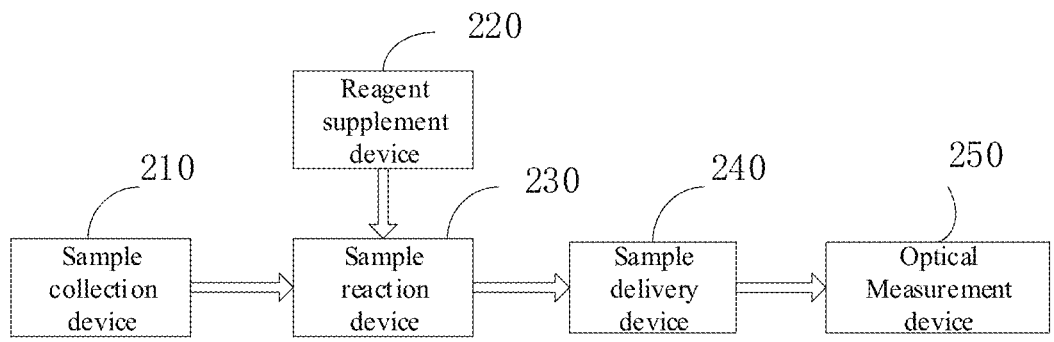
FIG. 7 is a schematic structural diagram of an analysis device according to another embodiment.

Referring to FIG. 7, in some embodiments, the analysis device 10 may include a sample collection device 210, a reagent supplement device 220, a sample reaction device 230, an analyte delivery device 240, an optical measurement device 250.

The sample collection device 210 is implemented for quantitatively collecting a sample and delivering the sample to the sample reaction device 230. In some embodiments, the sample collection device 210 includes a sampling needle, an injector and a clean swab for cleaning the sampling needle (not shown in FIGS.). Obviously, the sample collection device 210 is not limited to be implemented under above disclosures but is able to be configured according to requirements. For instance, in some other embodiments, the sample collection device 210 could further include an autoloader, a compartment, a sample rotary valve and a metering pump (not shown in FIGS.).

Before collecting the sample and delivering the sample to the sample reaction device 230, the scanning component 01 obtains scanning information by scanning the sample, and the image information obtaining component 02 obtains image information of a region in the sample containing a sample identifier, After then, the sample is dispatched to the sample collection device 210.

The reagent supplement device 220 is implemented for collecting a ration reagent from a reagent tube or a reagent bin and delivering the ration reagent to the sample reaction device 230. In some embodiments, the reagent includes diluents, fluorescent dye and/or hemolytic agent. The reagent is able to be configured according to the configuration of measurement models. If only white blood cell classification model is conducted, the reagent should include diluents, a hemolytic agent capable of lysing red blood cells and morphological processing white blood cells and a fluorescent dye only for white blood cell dying. If only reticulocytes counting model is conducted, the reagent should include diluents, a hemolytic agent capable of conducting morphological processing for red blood cells and a fluorescent dye only for reticulocytes dying.

In some embodiments, the reagent supplement device 220 includes an injector and necessary pipeline clean device. Obviously, the reagent supplement device 220 is not limited to be implemented under above disclosures, but is able to be properly adjusted according to specific requirement. Such as, in other embodiments, the reagent supplement device 220 could include a metering pump or a liquid storage pool for storing multiple reagents.

The sample reaction device 230 is implemented for containing the sample and the reagent to make the sample and the reagent to react for generating the analyte. In some embodiments, the sample reaction device 230 could include a temperature control device and a blending device. The temperature control device is implemented for providing a proper temperature environment to the reaction between the sample and the reagent. 42° C. is selected in some embodiments. Obviously, the temperature environment should be selected under requirements but not limited in above discussed embodiments.

The blending device is implemented for sufficiently blending the sample and the reagent. In some embodiments, the blending device, including an air pump and a control valve, could be implemented by generating bubbles to blend the sample and the reagent. It should be noted that the blending device could be implemented under other proper configuration in other embodiments but not limited to embodiments disclosed above. For example, the blending device, including an electrical mechanism, could be implemented by electric machinery for blending the sample and the reagent.

It should be understood that the entire sample reaction device 230 should be configured under practical requirements in other requirements but not limited to above embodiments. For instance, if reaction ability of the reagent is enough, the temperature control device and the blending device of the sample reaction device 230 could be omitted. In addition, multiple sample reaction modules respectively selected as the sample reaction device 230 in different measurement models is acceptable. For example, the white blood cell classification and the reticulocytes classification generally are conducted with different sample reaction modules. That could increase detection performance firstly, and avoid cross pollutions among different measurement models secondly.

The analyte delivery device 240 is implemented for delivering the analyte into the optical measurement device 250. Specifically, the analyte delivery device 240 delivers the analyte sufficiently reacted to the optical measurement device 250. In some embodiments, the analyte delivery device 240 could include two injectors, a pipeline and a control valve. One of the injector is implemented for driving the analyte passing through the optical measurement device 250 via the pipeline. Specifically, one of the injector provides pressures to make the analyte passing through the optical measurement device 250 and the other injector is implemented for driving diluents to form sheath fluid. The sheath fluid wraps up the analyte so as to form a sample stream passing through the optical measurement device 250.

The control valve could be configured on the pipeline for controlling on/off of the pipeline between different sample reaction devices to the optical measurement device 250 so as to select a proper analyte into the optical measurement device 250.

It should be understood that the analyte delivery device 240 should be configured under practical requirements in other requirements but not limited to above embodiments. Specifically, the injector could be replaced by an air source generating pressures or a liquid tank driving by pressures.

The optical measurement device 250 is implemented for illuminating the sample stream, collecting diffusion lights and fluorescent lights of cell articles when cell articles are illuminated and outputting corresponding electrical signals (diffusion light signal and fluorescent lights signals) of diffusion lights and fluorescent lights. In this embodiment, the electrical signals respectively reflect strength of the light signals (diffusion lights and fluorescent lights) so that electrical signals also can be defined as light signal information.

The foregoing is some descriptions of the structure of the analysis device 10. When the sample analysis system includes only one analysis device 10, the scanning component 01, the image information obtaining component 02, and the processor 03 in the sample analysis system may be integrated in the analysis device 10. For example, the scanning component 01 and the image information obtaining component 02 are both disposed on the sample feeding component 12. Specifically, when the sample feeding component 12 is a sample disk, the scanning component 01 and the image information obtaining component 02 may be disposed at a specific position of the sample disk. When the sample feeding component 12 includes a sample delivery module and a front-end track, the scanning component 01 and the image information obtaining component 02 may be disposed at a specific position of the front-end track.

Figure 8:
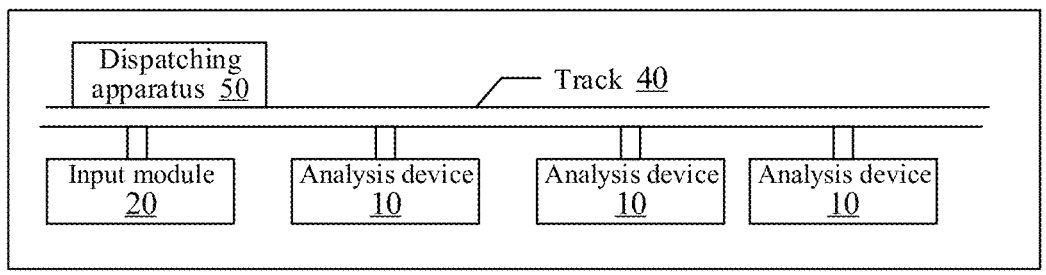
FIG. 8 is a schematic structural diagram of a sample analysis system according to another embodiment.
Figure 9:
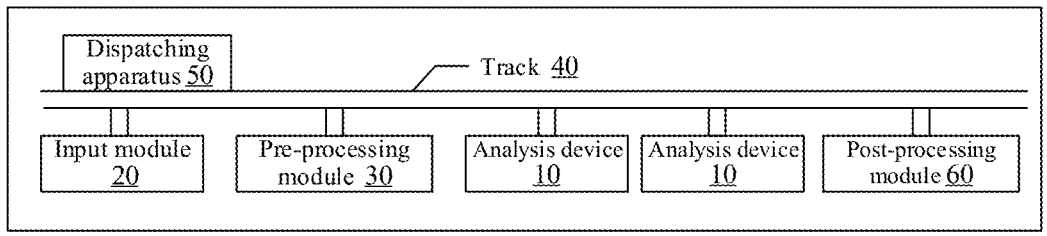
FIG. 9 is a schematic structural diagram of a sample analysis system according to still another embodiment.

As described above, in some embodiments, the sample analysis system includes a plurality of cascaded analysis devices 10, to form a system for testing in an assembly line. Referring to FIG. 8 and FIG. 9, to better test samples in an assembly line, in the embodiments of the sample analysis system including a plurality of cascaded analysis devices 10, the sample analysis system may further include an input module 20, a pre-processing module 30, a track 40, a dispatching apparatus 50, and a post-processing module 60. It should be noted that three analysis devices displayed in FIG. 8 and two analysis devices displayed in FIG. 9 are merely for illustration, and are not intended to limit the number of analysis devices of the sample analysis system to two or three.

The input module 20 may be configured to receive a sample to be tested that is placed by a user. In some embodiments, the input module 20 may be provided with said scanning component 01 and/or image information obtaining component 02. The scanning component 01 at the input module 20 is configured to scan the sample at the input module 20 to obtain scanning information, and the image information obtaining component 02 is configured to obtain image information of a region containing a sample identifier at the input module 20.

The pre-processing module 30 is configured to perform pre-processing on the sample to be tested that is received by the input module. Generally, after the user places the sample in the input module 20, a sample identifier of the sample is determined at the input module 20 based on the scanning information and/or the image information of the sample, the dispatching apparatus 50 then dispatches the sample to the pre-processing module 30 for pre-processing, and the pre-processed sample is then dispatched from the pre-processing module 30 to a corresponding analysis device 10 for testing.

Figure 10:
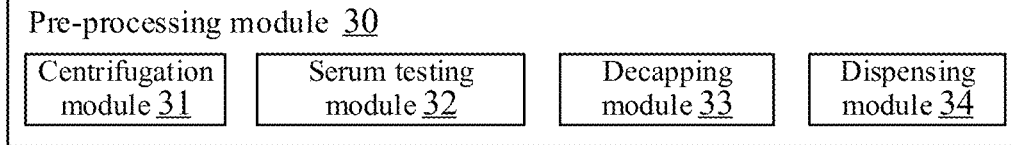
FIG. 10 is a schematic structural diagram of a pre-processing module according to an embodiment.

In an embodiment, referring to FIG. 10, the pre-processing module 30 may include one or more of a centrifugation module 31, a serum testing module 32, a decapping module 33, and a dispensing module 34. The centrifugation module 31 is configured to centrifuge a sample to be centrifuged. There may be one or more centrifugation modules 31. The serum testing module 32 is configured to detect whether the serum in the sample is sufficient and/or whether the serum in the sample is qualified, so as to determine whether the centrifuged sample can be used for subsequent measurement. The decapping module 33 is configured to decap the centrifuged sample. It may be understood that capping, sealing, decapping, and unsealing of the sample herein refer to capping, sealing, decapping, and unsealing of a sample tube that contains the sample. Generally, the sample needs to be decapped after being centrifuged, so that the dispensing module 34 or the analysis device subsequently performs sample dispensing or sample aspiration. The dispensing module 34 is configured to dispense the sample, for example, to divide the sample into a plurality of parts and deliver the plurality of parts to different analysis devices 10 for measurement respectively. A general pre-processing procedure of the pre-processing module 30 is as follows: The centrifugation module 31 receives and centrifuges the sample dispatched by the input module 20; the serum testing module 32 tests the serum in the centrifuged sample and determines whether the sample can be used for subsequent measurement, and if the serum is insufficient or unqualified, the sample cannot be used for subsequent measurement; and if the serum testing is passed, the sample is dispatched to the decapping module 33, and the decapping module 33 decaps the sample; if there is a dispensing module 34, the dispensing module 34 dispenses the decapped sample and dispatches the dispensed sample to the corresponding analysis device 10 for measurement, and if there is no dispensing module 34, the sample is dispatched from the decapping module 33 to the corresponding analysis device 10 for measurement. It should be noted that the pre-processing module 30 is not necessarily required. In some embodiments, the sample analysis system may not include the pre-processing module 30, as shown in FIG. 8, for example. In some embodiments, the sample analysis system may include the pre-processing module 30, as shown in FIG. 9, for example.

The track 40 is configured to connect the devices together. For example, the track connects the input module 20 and the plurality of analysis devices 10, so that the sample can be dispatched over the track 40 from the input module 20 to the analysis devices 10 for testing. In some examples in which the pre-processing module 30 and the post-processing module 60 are included, the track 40 sequentially connects the input module 20, the pre-processing module 30, the analysis devices 10, and the post-processing module 60.

The dispatching apparatus 50 is configured to dispatch a sample over the track 40, for example, to dispatch a sample from the input module 20 to the analysis devices 10, so as to dispatch the sample from one analysis device 10 to another analysis device 10.

Figure 11:
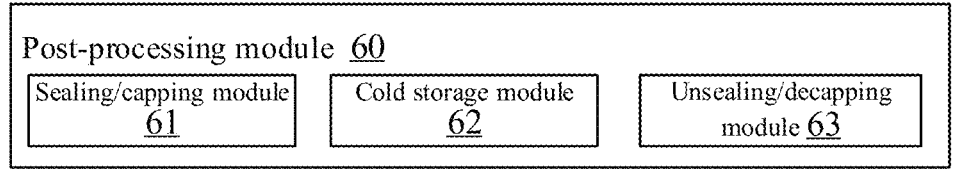
FIG. 11 is a schematic structural diagram of a post-processing module according to an embodiment.

The post-processing module 60 is configured to perform post-processing on the sample. In an embodiment, referring to FIG. 11, the post-processing module 60 includes one or more of a sealing/capping module 61, a cold storage module 62, and an unsealing/decapping module 63. The sealing/capping module 61 is configured to seal or cap the sample. The cold storage module 62 is configured to store the sample. The unsealing/decapping module 63 is configured to unseal or decap the sample. A general post-processing procedure of the post-processing module 60 is as follows: After being aspirated by all the analysis devices 10 for required measurement, the sample is dispatched to the sealing/capping module 61, the sealing/capping module 61 seals or caps the measured sample, and then the sample is dispatched to the cold storage module 62 for storage; and if the sample needs to be measured again, the sample is dispatched out of the cold storage module 62, subjected to unsealing or decapping in the unsealing/decapping module 63, and then dispatched to a corresponding analysis device for measurement. It should be noted that the post-processing module 60 is not necessarily required. In some embodiments, the sample analysis system may not include the post-processing module 60, as shown in FIG. 8, for example. In some embodiments, the sample analysis system may include the post-processing module 60, as shown in FIG. 9, for example.

Figure 12:
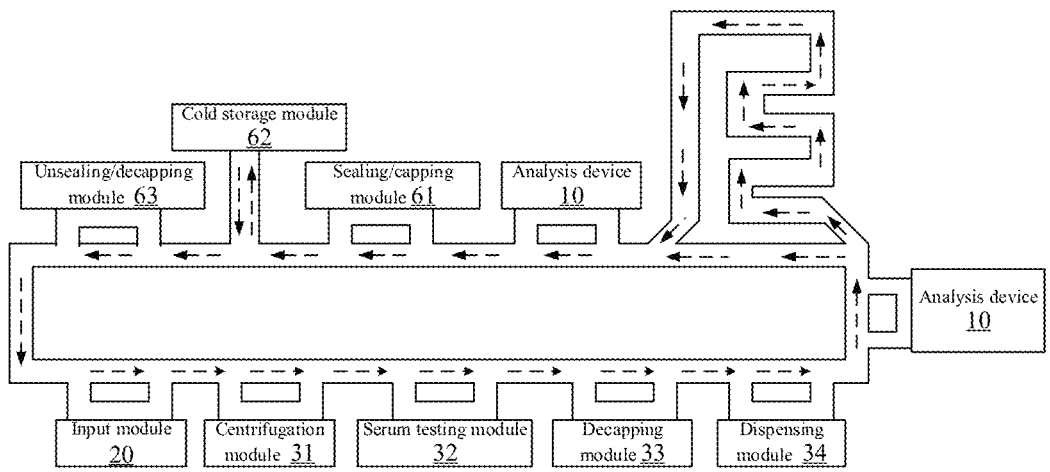
FIG. 12 is a schematic structural diagram of a sample analysis system according to yet another embodiment.

FIG. 12 is another schematic structural diagram of a sample analysis system including the pre-processing module 30 and the post-processing module 60 according to the disclosure. As shown in FIG. 12, each device or module may be further provided with a module buffer area, the track 40 may also be provided with a track buffer area, and the entire track may be a cyclic track. It should be noted that all types of modules displayed in the figure are singular. However, persons skilled in the art may understand that the number is not limited herein, for example, there may be a plurality of centrifugation modules 31, and there may also be a plurality of decapping modules 33.

When the sample analysis system includes only a plurality of analysis devices 10, any one or more of the input module 20 and the analysis devices 10 of the sample analysis system may be provided with either or both of the scanning component 01 and the image information obtaining component 02. For example, the input module 20 may be provided with either or both of the scanning component 01 and the image information obtaining component 02. Any analysis device 10 may also be provided with either or both of the scanning component 01 and the image information obtaining component 02. There may be one or more processors 03. For example, the input module is provided with a processor 03. For another example, a processor 03 is integrated in each analysis device 10. For another example, a unified processor 03 is used to process the scanning information and/or the image information obtained by the input module 20 and the analysis devices 10. Alternatively, the entirety of components having an information processing function at the input module 20 and the analysis devices may be collectively referred to as a processor 03 herein. In specific implementation, the processor 03 may be a central processing unit (CPU for short), or may be a general-purpose processor, a digital signal processor (DSP for short), an application-specific integrated circuit (ASIC for short), or the like. The general-purpose processor may be a microprocessor, or the processor may be any conventional processor, etc.

Figure 13:
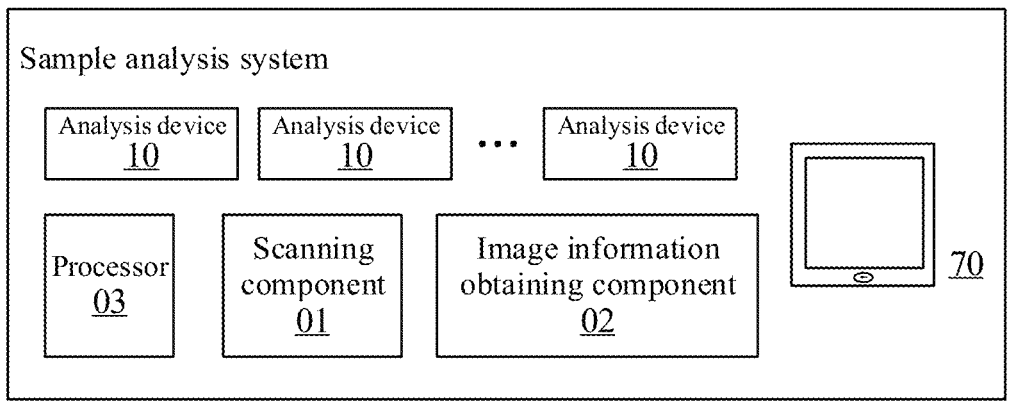
FIG. 13 is a schematic structural diagram of a sample analysis system according to still yet another embodiment.

Certainly, in some embodiments, the sample analysis system may further include a display 70, as shown in FIG. 13, for example.

The foregoing is some descriptions of the sample analysis system.

In some embodiments, when the processor 03 fails to determine the sample identifier of the sample based on the scanning information of the sample, the image information of the region in the sample containing the sample identifier that is obtained by the image information obtaining component 02 is used to determine the sample identifier of the sample. Typically, for example, due to factors such as poor quality and scratches of the information code of the sample, the scanning information obtained when the scanning component 01 scans the sample is incorrect or even blank, which may be referred to as a scanning failure. The processor 03 cannot correctly decode the scanning information, and therefore cannot determine the sample identifier based on the scanning information. In this case, the image information of the region in the sample containing the sample identifier that is obtained by the image information obtaining component 02 is used to determine the sample identifier of the sample. It may be understood that in some cases, when the scanning component 01 scans the sample, the image information obtaining component 02 photographs the sample to obtain the image information of the region of the sample containing the sample identifier. In some cases, the scanning component 01 scans the sample, and if the processor 03 cannot determine the sample identifier of the sample based on the scanning information of the sample, the image information obtaining component 02 photographs the sample to obtain the image information of the region of the sample containing the sample identifier.

The following describes how the image information of the sample is used to determine the sample identifier of the sample in a case of a scanning failure.

In some cases, when the sample identifier of the sample fails to be determined based on the scanning information of the sample, the sample identifier of the sample may be determined based on the image information of the region in the sample containing the sample identifier.

Therefore, in some embodiments, when the processor 03 fails to determine the sample identifier of the sample based on the scanning information of the sample, the processor 03 determines the sample identifier of the sample based on the image information of the sample that is obtained by the image information obtaining component 02. For example, the processor 03 performs image recognition on the image information and extracts the sample identifier (for example, numbers representing the sample identifier), to determine the sample identifier. The processor 03 may determine, upon a scanning failure or later when a test result is obtained, the sample identifier of the sample based on the image information of the sample that is obtained by the image information obtaining component 02. These two cases are described separately in the following.

Upon a scanning failure, the sample identifier is determined based on the image information, so that the system can proceed according to a normal test procedure. Therefore, in some embodiments, when the processor 03 fails to determine the sample identifier of the sample based on the scanning information of the sample, the processor 03 determines the sample identifier of the sample based on the image information of the sample that is obtained by the image information obtaining component 02, and determines a test item for the sample based on the sample identifier of the sample.

In one scenario, when a scanning failure of a sample occurs in the scanning component 01 of the input module 20, the processor 03 determines a sample identifier based on image information of the sample that is obtained by the image information obtaining component 02 of the input module 20, so that testing can normally proceed. For example, a test item for the sample is determined based on the sample identifier that is determined based on the image information, so that the system dispatches the sample to a corresponding analysis device 10 for testing. In one scenario, after the analysis device 10 receives a sample, when a scanning failure of the sample occurs in the scanning component 01 of the analysis device 10, the processor 03 determines a sample identifier based on image information of the sample that is obtained by the image information obtaining component 02 of the analysis device 10, so that testing can normally proceed. For example, a test item for the sample is determined based on the sample identifier that is determined based on the image information, so that the analysis device 10 tests the sample and associates a test result with the sample.

In some cases, the sample identifier is determined based on the image information after a scanning failure, for example, after a test result is obtained. Therefore, in some embodiments, when the processor 03 fails to determine the sample identifier of the sample based on the scanning information of the sample, the processor 03 allocates a unique invalid identifier to the sample, and enables a specific test mode for the sample. For example, the processor 03 enables a test mode for the sample, wherein the test mode includes maximum supported items of the analysis device, or the processor 03 enables a test mode for the sample, wherein the test mode includes normal items of the analysis device. In the test mode including maximum supported items of the analysis device, the analysis device performs as many test items on the sample as the analysis device currently can perform. For example, a maximum supported item set including one or more items may be established in advance for the analysis device, and when the analysis device enables the test mode including maximum supported items, the items in the maximum supported item set are performed on the sample. In the test mode including normal items of the analysis device, the analysis device performs normal items on the sample. For example, a normal item set including one or more items may be established in advance for the analysis device, and when the analysis device enables the test mode including normal items, the items in the normal item set are performed on the sample. It can be seen that although a sample has no correct sample identifier, the processor 03 allocates a unique invalid identifier for the sample and enables a specific test mode, such that testing for the sample can be continued, a test result is associated with the invalid identifier, and the invalid identifier is subsequently modified to a correct sample identifier.

Figure 14:
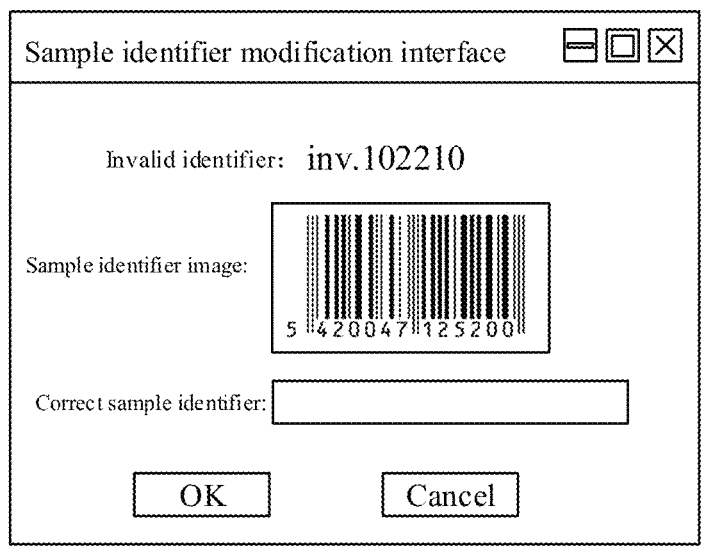
FIG. 14 is a schematic diagram of a sample identifier modification interface according to an embodiment.

Therefore, in some embodiments, the processor 03 may subsequently determine the sample identifier of the sample according to the sample identifier determined based on the image information, and modify the invalid identifier of the sample to the correct sample identifier. In some other embodiments, referring to FIG. 14, the display 70 may be configured to display a sample identifier modification interface, wherein the sample identifier modification interface includes an invalid identifier of an invalid sample, a sample identifier image of the invalid sample, and an interface component for inputting a sample identifier; wherein the invalid sample is a sample with an invalid identifier, and the sample identifier image is generated by the processor 03 based on the image information of the region containing the sample identifier of the invalid sample. In the example of FIG. 14, the invalid identifier is inv.102210, wherein "inv" indicates that the sample identifier is an invalid identifier, and "102210" sequentially represents hour, minute, and second when scanning of the sample fails. For example, "102210" indicates the sample which fails to be that scanned at 10:22:10 AM. In this way, it can be ensured that the invalid identifier is unique. Certainly, the invalid identifier can be constructed in other ways. Details are not described herein. In the figure, the image displayed below the invalid identifier is a corresponding image generated based on the image information of the region containing the sample identifier. A user checks the image and fills in a box below the image with the correct sample identifier, for example, numbers in the figure. In the figure, the box is the foregoing interface component. The processor 03 receives the inputted sample identifier via the interface component, and then modifies the invalid identifier of the invalid sample to the inputted sample identifier, so that a test result of the sample can be associated with the correct sample identifier. Optionally, in some embodiments, the processor 03 may determine the sample identifier of the invalid sample based on the image information of the invalid sample, and input the sample identifier into the interface component so as to be displayed by the display. In this way, the user only needs to check whether the processor 03 succeeds in recognition. If yes, the user clicks on the OK button to input a confirmation command to the system; and if no, the user modifies the sample identifier in the interface component via an input tool such as a keyboard and then clicks on the OK button to input a confirmation command to the system. In response to the confirmation command, the processor 03 receives the inputted sample identifier via the interface component, and modifies the invalid identifier of the invalid sample to the currently inputted sample identifier.

In one scenario, after the analysis device 10 receives a sample, when a scanning failure of the sample occurs in the scanning component 01 of the analysis device 10, the processor 03 determines the sample identifier based on image information of the sample that is obtained by the image information obtaining component 02 of the analysis device 10, the processor 03 allocates a unique invalid identifier to the sample, and the analysis device 10 enables a specific test mode for the sample (for example, a test mode including maximum supported items of the analysis device or a test mode including normal items of the analysis device) and associates a test result with the invalid identifier; and then, the processor 03 performs automatic recognition based on the image information of the invalid sample to determine the sample identifier of the invalid sample, or the processor 03 obtains the sample identifier of the invalid sample via the foregoing interface component of the sample identifier modification interface, and modifies the invalid identifier of the invalid sample to the correct sample identifier, so that the test result of the sample can be associated with the correct sample identifier.

When the sample analysis system includes a plurality of analysis devices 10, and two or more analysis devices 10 cannot correctly scan a sample, the analysis devices with a scanning failure all allocate an invalid identifier to the current sample with the scanning failure. In one possible scenario, when a same sample cannot be correctly scanned at the plurality of analysis devices 10, a plurality of invalid identifiers are allocated to the sample. For example, when a scanning failure of a sample S occurs in a first analysis device 10 and a second analysis device 10 at 10:22:10 and 11:01:02 respectively, an invalid identifier inv.102210 is allocated to the sample S in the first analysis device 10, and the first analysis device 10 tests the sample S and associates a test result with the invalid identifier inv.102210; an invalid identifier inv.110102 is allocated to the sample S in the second analysis device 10, and the second analysis device 10 tests the sample S and associates a test result with the invalid identifier inv.110102. In a case of modifying the invalid identifiers of the invalid sample via the sample identifier modification interface, a user needs to modify twice: when the invalid identifier inv.102210 is modified, an image obtained by the image information obtaining component 02 of the first analysis device 10 is displayed on the sample identifier modification interface, and the user modifies the invalid identifier inv.102210 to a correct sample identifier based on the image; and when the invalid identifier inv.110102 is modified, an image obtained by the image information obtaining component 02 of the second analysis device 10 is displayed on the sample identifier modification interface, and the user modifies the invalid identifier inv.110102 to a correct sample identifier based on the image. This is definitely inconvenient. In another possible scenario, one or more analysis devices 10 may succeed in scanning a sample and may determine a sample identifier based on the scanning information of the sample. However, a scanning failure may occur in other analysis devices 10, and the sample identifier cannot be determined based on the scanning information thereof.

Therefore, considering the foregoing scenarios, in some embodiments, the processor 03 further obtains a position index and a sample identifier of each sample, and establishes a mapping relationship between the position index and the sample identifier of each sample; and when the processor 03 fails to determine the sample identifier of the sample based on the scanning information of the sample, the processor further determines the sample identifier of the sample based on the position index of the sample and according to the mapping relationship. In one scenario, when the input module 20 or some analysis devices 10 succeed in scanning a sample and can determine a sample identifier based on scanning information of the sample, but some other analysis devices 10 fail in scanning and cannot determine the sample identifier of the sample based on the scanning information, or even the user or the processor 03 cannot determine the sample identifier of the sample based on the image information, since one sample has one position index, the invalid identifier can be modified to the correct sample identifier that corresponds to the position index, or the correct sample identifier that corresponds to the position index is directly allocated to the sample with scanning failure without introducing an invalid identifier. In one scenario, after the user modifies the invalid identifier of the invalid sample to the correct sample identifier on the sample identifier modification interface, if the position index associated with the invalid identifier of the invalid sample also corresponds to other invalid identifiers of the invalid sample, the processor 03 automatically modifies other corresponding invalid identifiers to the correct sample identifier, and the user does not need to modify the plurality of invalid identifiers of the sample one by one.

It should be noted that the position index of the sample is different from the sample identifier. For example, the position index of the sample may include: identification information of a test tube rack in which the sample is located, for example, a tube rack number, and a position of the sample in the test tube rack, where the tube rack number of the test tube rack is identification information carried by the test tube rack, for example, a test tube rack No. 1 carries a tube rack number "1". Identification information of a sample rack, for example, a tube rack number, may be determined by scanning an information code (for example, a barcode) on the sample rack. The identification information of the test tube rack, for example, the tube rack number, is used to identify the test tube rack and has uniqueness. Generally, one test tube rack may hold a plurality of sample holding containers. It can be seen that the position index is different from the sample identifier, the position index is used to represent a position of a sample in a specific test tube rack, and the sample identifier is used to distinguish a different sample. For example, when a tube rack number of a test tube rack is 2, sample holding containers on the test tube rack are scanned to determine that four samples with sample identifiers A, B, C, and D in the test tube rack are respectively located at a position 1, a position 2, a position 3, and a position 4 of the test tube rack with the test tube number 2, and position indexes of the sample A, the sample B, the sample C, and the sample D are represented as 2-1, 2-2, 2-3, and 2-4 respectively. The sample identifiers and the position indexes may all be displayed on a display interface for a user to check.

The foregoing describes the sample analysis system in some embodiments of the disclosure. In some embodiments, the disclosure further discloses a sample management method. The sample management method of the disclosure may be applied to the sample analysis system that includes at least one analysis device.

Figure 15:
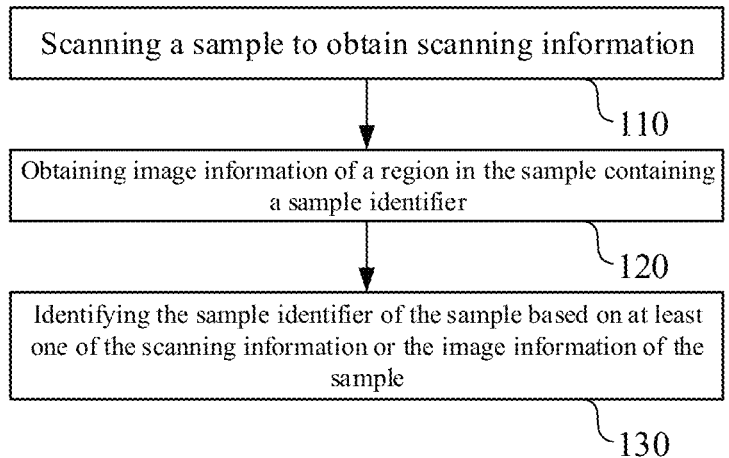
FIG. 15 is a flowchart of a sample management method according to an embodiment.

Referring to FIG. 15, a sample management method disclosed in some embodiments includes step 110 to step 130. Details are described in the following.

Step 110: scanning a sample to obtain scanning information of the sample. For example, the scanning information is obtained by scanning an information code of the sample.

Step 120: obtaining image information of a region in the sample containing a sample identifier. For example, the image information is obtained by photographing the sample.

Step 130: identifying the sample identifier of the sample based on at least one of the scanning information or the image information of the sample. For example, for any sample, when step 130 can determine the sample identifier of the sample based on either of the scanning information and the image information, step 130 may determine the sample identifier based on either of them, and may preferably determine the sample identifier based on the scanning information. Alternatively, step 130 determines the sample identifier based on the scanning information and the image information respectively and then compares the sample identifier determined based on the scanning information with the sample identifier determined based on the image information. If the sample identifier determined based on the scanning information and the sample identifier determined based on the image information are the same, it indicates that the sample identifier is correct, and if the sample identifier determined based on the scanning information and the sample identifier determined based on the image information are different, a prompt is issued. Optionally, in this case, the sample identifier determined based on one of the scanning information or the image information may be temporarily used as a temporary sample identifier of the sample for item testing and association of test results. In some cases, for example, when the captured image information is so blurred that step 130 can determine the sample identifier based on only the scanning information thereof rather than the image information thereof, step 130 determines the sample identifier based on the scanning information. In some cases, for example, when the information code of the sample is partly stained, and step 130 can determine the sample identifier based on only the image information thereof rather than the scanning information thereof, step 130 determines the sample identifier based on the image information.

Figure 16:
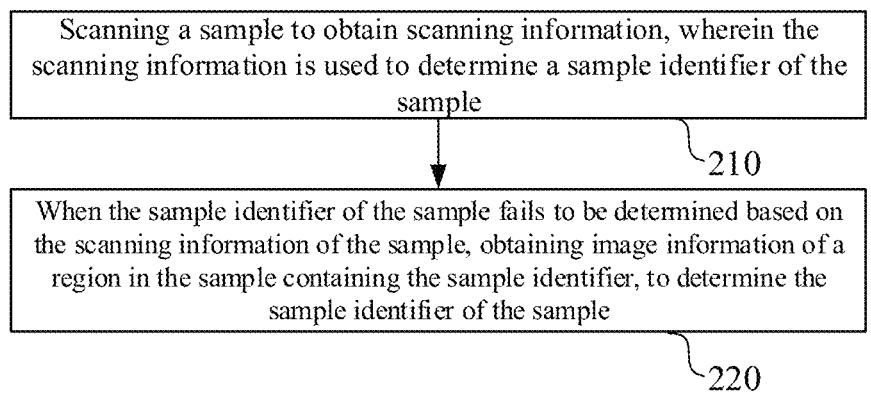
FIG. 16 is a flowchart of a sample management method according to another embodiment.

Referring to FIG. 16, a sample management method disclosed in some embodiments includes step 210 and step 220. Details are described in the following.

Step 210: scanning a sample to obtain scanning information of the sample, wherein the scanning information is used to determine a sample identifier of the sample.

Step 220: when the sample identifier of the sample fails to be determined based on the scanning information of the sample, obtaining image information of a region in the sample containing the sample identifier, to determine the sample identifier of the sample. In some embodiments, only when the sample identifier of the sample fails to be determined based on the scanning information of the sample, step 220 photographs the sample to obtain the image information of the region in the sample containing the sample identifier. In some other embodiments, regardless of whether the sample identifier of the sample can be determined based on the scanning information of the sample, step 220 photographs the sample. If the sample identifier can be determined based on the scanning information of the sample, step 220 no longer obtains the image information of the region in the sample containing the sample identifier, to determine the sample identifier of the sample. If the sample identifier cannot be determined based on the scanning information of the sample, step 220 then obtains the image information of the region in the sample containing the sample identifier, to determine the sample identifier of the sample.

The following describes how the image information of the sample is used to determine the sample identifier of the sample in a case of a scanning failure.

In some cases, when the sample identifier of the sample fails to be determined based on the scanning information of the sample, the sample identifier of the sample may be determined based on the image information of the region in the sample containing the sample identifier.

Therefore, in some embodiments, when step 220 fails to determine the sample identifier of the sample based on the scanning information of the sample, step 220 determines the sample identifier of the sample based on the obtained image information of the sample. For example, step 220 performs image recognition on the image information and extracts the sample identifier (for example, numbers representing the sample identifier), to determine the sample identifier. Step 220 may determine, upon a scanning failure or later when a test result is obtained, the sample identifier of the sample based on the obtained image information of the sample. These two cases are described respectively in the following.

Upon a scanning failure, the sample identifier is determined based on the image information, so that the system can proceed according to a normal test procedure. Therefore, in some embodiments, when step 220 fails to determine the sample identifier of the sample based on the scanning information of the sample, step 220 determines the sample identifier of the sample based on the obtained image information of the sample, and determines a test item for the sample based on the sample identifier of the sample.

Figure 17:
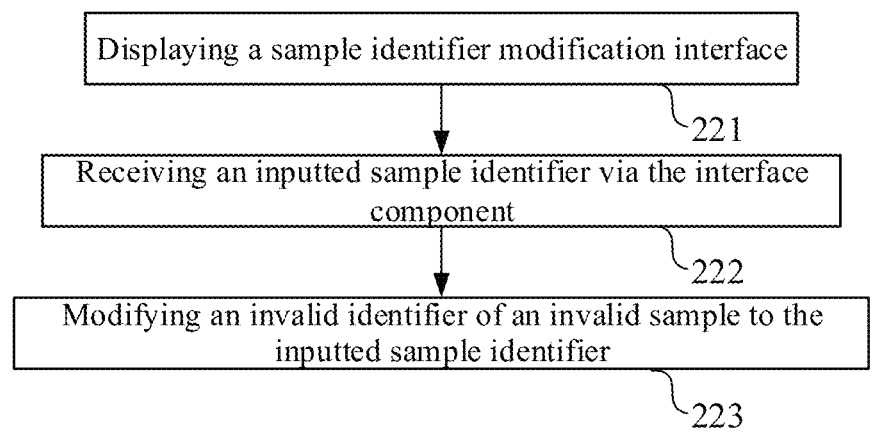
FIG. 17 is a flowchart of modifying a sample identifier via a sample identifier modification interface according to an embodiment.

In some cases, the sample identifier is determined based on the image information after a scanning failure, for example, after a test result is obtained. Therefore, in some embodiments, when step 220 fails to determine the sample identifier of the sample based on the scanning information of the sample, step 220 allocates a unique invalid identifier to the sample, and enables a specific test mode for the sample. For example, step 220 enables a test mode for the sample, which includes maximum supported items of the analysis device, or step 220 enables a test mode for the sample, which includes normal items of the analysis device. For the test mode including maximum supported items and the test mode including normal items of the analysis device, reference can be made to the foregoing description, details are not described herein again. In some embodiments, step 220 may subsequently determine the sample identifier of the sample according to the sample identifier determined based on the image information, and modify the invalid identifier of the sample to the correct sample identifier. In some other embodiments, referring to FIG. 17, step 220 may include substep 221 to substep 223. At substep 221, a sample identifier modification interface is displayed. The sample identifier modification interface includes an invalid identifier of an invalid sample, a sample identifier image of the invalid sample, and an interface component for inputting a sample identifier, wherein the invalid sample is a sample with an invalid identifier, and the sample identifier image is generated by the processor 03 based on image information of a region containing the sample identifier of the invalid sample. FIG. 14 described above is an example of the sample identifier modification interface. At substep 222, an inputted sample identifier is received via the interface component. At substep 223, the invalid identifier of the invalid sample is modified to the inputted sample identifier, to associate a test result of the sample with the correct sample identifier. Optionally, in some embodiments, substep 222 may determine the sample identifier of the invalid sample based on the image information of the invalid sample, and input the sample identifier into the interface component so as to be displayed. In this way, the user only needs to check whether substep 222 succeeds in recognition. If yes, the user clicks on the OK button and inputs a confirmation command to the system; and if no, the user modifies the sample identifier in the interface component via an input tool such as a keyboard and then clicks on the OK button and inputs a confirmation command to the system. In response to the confirmation command, substep 223 receives the inputted sample identifier via the interface component, and modifies the invalid identifier of the invalid sample to the currently inputted sample identifier.

The sample management method in some embodiments further includes step 310 and step 320. Details are described in the following.

Step 310: obtaining a position index and a sample identifier of each sample, and establish a mapping relationship between the position index and the sample identifier for each sample.

Step 320: when the sample identifier of the sample fails to be determined based on the scanning information of the sample, further determining the sample identifier of the sample based on the position index of the sample and according to the mapping relationship.

In one scenario, when the input module 20 or some analysis devices 10 succeed in scanning a sample and can determine a sample identifier based on scanning information of the sample, but some other analysis devices 10 fail in scanning and cannot determine the sample identifier of the sample based on the scanning information, or even the user or the processor 03 cannot determine the sample identifier of the sample based on the image information, since one sample has one position index, the invalid identifier can be modified to the correct sample identifier that corresponds to the position index, or the correct sample identifier that corresponds to the position index is directly allocated to the sample with scanning failure without introducing the invalid identifier. In one scenario, after the user modifies the invalid identifier of the invalid sample to the correct sample identifier on the sample identifier modification interface, if the position index associated with the invalid identifier of the invalid sample also corresponds to other invalid identifiers of the invalid sample, the processor 03 automatically modifies other corresponding invalid identifiers to the correct sample identifier, and the user does not need to modify a plurality of invalid identifiers of the sample one by one.

It should be noted that the position index of the sample is different from the sample identifier. For example, the position index of the sample may include: identification information of a test tube rack in which the sample is located, for example, a tube rack number, and a position of the sample in the test tube rack, wherein the tube rack number of the test tube rack is identification information carried by the test tube rack, for example, a test tube rack No. 1 carries a tube rack number "1". Identification information of a sample rack, for example, a tube rack number, may be determined by scanning an information code (for example, a barcode) on the sample rack. The identification information of the test tube rack, for example, the tube rack number, is used to identify the test tube rack and has uniqueness. Generally, one test tube rack may hold a plurality of sample holding containers. It can be seen that the position index is different from the sample identifier, the position index is used to represent a position of a sample in a specific test tube rack, and the sample identifier is used to distinguish a different sample. For example, when a tube rack number of a test tube rack is 2, sample holding containers on the test tube rack are scanned to determine that four samples with sample identifiers A, B, C, and D in the test tube rack are respectively located at a position 1, a position 2, a position 3, and a position 4 of the test tube rack with the test tube number 2, and position indexes of the sample A, the sample B, the sample C, and the sample D are represented as 2-1, 2-2, 2-3, and 2-4 respectively. The sample identifiers and the position indexes may all be displayed on a display interface for a user to check.

The description has been made with reference to various exemplary embodiments herein. However, persons skilled in the art would have appreciated that changes and modifications could have been made to the exemplary embodiments without departing from the scope herein. For example, various operation steps and assemblies for executing operation steps may be implemented in different ways according to a specific application or considering any number of cost functions associated with the operation of the system (for example, one or more steps may be deleted, modified or incorporated into other steps).

In the above embodiments, the disclosure may be implemented in whole or in part by software, hardware, firmware, or any combination thereof. In addition, as understood by persons skilled in the art, the principles herein may be reflected in a computer program product on a computer-readable storage medium that is pre-installed with computer-readable program code. Any tangible, non-transitory computer-readable storage medium can be used, including magnetic storage devices (hard disks, floppy disks, etc.), optical storage devices (CD-ROM, DVD, Blu Ray disks, etc.), flash memories, and/or the like. These computer program instructions can be loaded onto a general-purpose computer, a dedicated computer, or other programmable data processing apparatus to form a machine, such that these instructions executed on a computer or other programmable data processing apparatus can generate an apparatus that implements a specified function. These computer program instructions can also be stored in a computer-readable memory that can instruct a computer or other programmable data processing apparatus to operate in a specific manner, such that the instructions stored in the computer-readable memory can form a manufactured product, including an implementation apparatus that implements a specified function. The computer program instructions may also be loaded onto a computer or other programmable data processing apparatus, such that a series of operating steps are executed on the computer or other programmable device to produce a computer-implemented process, such that the instructions executed on the computer or other programmable device can provide steps for implementing a specified function.

Although the principles herein have been shown in various embodiments, many modifications of structures, arrangements, ratios, elements, materials, and components that are particularly suitable for specific environments and operating requirements can be made without departing from the principles and scope of the disclosure. The above modifications and other changes or amendments will be included within the scope herein.

The above specific description has been described with reference to various embodiments. However, persons skilled in the art would have appreciated that various modifications and changes could have been made without departing from the scope of the disclosure. Therefore, consideration of the disclosure will be in an illustrative rather than a restrictive sense, and all such modifications will be included within the scope thereof. Likewise, the advantages of various embodiments, other advantages, and the solutions to problems have been described above. However, the benefits, advantages, solutions to problems, and any elements that can produce these, or solutions that make them more explicit, should not be interpreted as critical, necessary, or essential. The term "comprise", "include", and any other variants thereof used herein are non-exclusive, so that the process, method, article, or device that includes a list of elements includes not only these elements, but also other elements that are not explicitly listed or do not belong to the process, method, system, article, or device. Furthermore, the term "coupling" and any other variations thereof used herein refer to physical connection, electrical connection, magnetic connection, optical connection, communication connection, functional connection, and/or any other connection.

Persons skilled in the art will recognize that many changes may be made to the details of the above-described embodiments without departing from the basic principles of the disclosure. Therefore, the scope of the disclosure should be determined only by the claims as follows.

What is claimed is:

1. A sample analysis system, comprising:
   a scanning component configured to scan a region containing a sample identifier of a sample on a sample holding container containing the sample, to obtain scanning information of the sample identifier;
   an image information obtaining component configured to obtain an image of the region containing the sample identifier of the sample on the sample holding container; and
   a processor configured to determine the sample identifier of the sample based on the scanning information of the sample identifier,
   wherein, when the processor fails to determine the sample identifier of the sample based on the scanning information, the processor is further configured to; perform image recognition on the image of the region containing the sample identifier of the sample on the sample holding container to determine the sample identifier of the sample, and determine at least one test item to be performed for the sample based on said determined sample identifier.

2. The sample analysis system of claim 1, wherein, when the scanning component scans the region, the image information obtaining component photographs the region so as to obtain the image of the region containing the sample identifier of the sample on the sample holding container, regardless of whether the sample identifier of the sample can be determined based on the scanning information, or when the processor fails to determine the sample identifier of the sample based on the scanning information, the image information obtaining component photographs the region so as to obtain the image of the region containing the sample identifier of the sample on the sample holding container.

3. The sample analysis system of claim 1, wherein the scanning component and the image information obtaining component are integrated in a same device.

4. The sample analysis system of claim 1, further comprising an analysis device,
wherein the processor is further configured to:
control the analysis device to perform the at least one test item for the sample, and
associate at least one test result with the sample identifier.

5. The sample analysis system of claim 4, wherein the scanning component and the image information obtaining component are integrated in the analysis device.

6. The sample analysis system of claim 1, further comprising an input module, a plurality of analysis devices, a track, and a dispatching apparatus,
wherein the input module is configured to receive the sample to be tested, the input module is provided with the scanning component and the image information obtaining component;
the processor is further configured to:
control the dispatching apparatus to dispatch the sample over the track from the input module to one or more of the plurality of analysis devices corresponding to the at least one test item to be performed for the sample.

7. The sample analysis system of claim 6, wherein each of the plurality of analysis devices is provided with a respective scanning component and a respective image information obtaining component;
wherein each of the one or more of the plurality of analysis devices is configured to:
further determine the sample identifier by using at least one of the respective scanning component and the respective image information obtaining component;
determine at least one test item to be performed for the sample based on the sample identifier;
perform the at least one test item for the sample; and
associate at least one test result with the sample identifier.

8. The sample analysis system of claim 1, further comprising a display, configured to:
display, on a display interface, the determined sample identifier and the image of the region containing the sample identifier of the sample, when the sample identifier of the sample is determined based on the image recognition; or
display, on the display interface, the determined sample identifier and the image of the region containing the sample identifier of the sample, regardless of whether the sample identifier of the sample is determined based on the scanning information or based on the image recognition.

9. A sample management method, performed by a sample analysis system, comprising:
scanning, by a scanning component of the sample analysis system, a region containing a sample identifier of a sample on a sample holding container containing the sample, to obtain scanning information of the sample identifier;

determining, by a processor of the sample analysis system, the sample identifier of the sample based on the scanning information;
performing, by the processor, image recognition on n image of the region containing the sample identifier of the sample on the sample holding container to determine the sample identifier of the sample, when the sample identifier of the sample is failed to be determined based on the scanning information of the sample identifier; and
determining, by the processor, at least one test item to be performed for the sample based on the sample identifier determined based on the image.

10. The sample management method of claim 9, further comprising:
obtaining, by an image information obtaining component of the sample analysis system, the image of the region containing the sample identifier of the sample on the sample holding container, comprising:
while scanning, photographing to obtain the image of the region containing the sample identifier of the sample on the sample holding container, regardless of whether the sample identifier of the sample can be determined based on the scanning information, or
photographing to obtain the image of the region containing the sample identifier of the sample on the sample holding container, when the sample identifier of the sample is failed to be determined based on the scanning information.

11. The sample management method of claim 9, further comprising:
controlling, by the processor, an analysis device in the sample analysis system to perform the at least one test item for the sample, and
associating, by the processor, at least one test result with the sample identifier.

12. The sample management method of claim 9, further comprising:
receiving, by an input module of the sample analysis system, the sample to be tested; and
controlling, by the processor, a dispatching apparatus to dispatch the sample over a track from the input module to one or more analysis devices corresponding to the at least one test item to be performed for the sample.

13. The sample management method of claim 12, further comprising following operations performed by each of the one or more analysis devices:
further determining the sample identifier by using at least one of a respective scanning component and a respective image information obtaining component in each analysis device;
determining at least one test item to be performed for the sample by said analysis device based on the sample identifier;
performing the at least one test item for the sample; and
associating at least one test result with the sample identifier.

14. The sample management method of claim 9, further comprising:
displaying, by a display in the sample analysis system, the sample identifier and the image of the region containing the sample identifier of the sample on a display interface, when the sample identifier of the sample is determined based on the image recognition; or
displaying, by the display in the sample analysis system, the sample identifier and the image of the region containing the sample identifier of the sample on a display interface, regardless of whether the sample identifier of the sample is determined based on the scanning information or based on the image recognition.

* * * * *